US008559391B2

(12) United States Patent  
Lu et al.

(10) Patent No.: US 8,559,391 B2  
(45) Date of Patent: Oct. 15, 2013

(54) OPEN WIRELESS ARCHITECTURE (OWA) UNIFIED AIRBORNE AND TERRESTRIAL COMMUNICATIONS ARCHITECTURE

(76) Inventors: Wei Lu, Cupertino, CA (US); David Dexi Lu, Cupertino, CA (US); Michael Lu, Cupertino, CA (US); Jianhong Hu, Cupertino, CA (US)

( * ) Notice: Subject to any disclaimer, the term of this patent is extended or adjusted under 35 U.S.C. 154(b) by 751 days.

(21) Appl. No.: 12/704,969

(22) Filed: Feb. 12, 2010

(65) Prior Publication Data

US 2010/0142482 A1   Jun. 10, 2010

(51) Int. Cl.  
*H04W 4/00* (2009.01)  
*H04W 36/00* (2009.01)

(52) U.S. Cl.  
USPC ........... 370/331; 370/332; 455/431; 455/436; 455/442

(58) Field of Classification Search  
USPC .................. 370/331, 332; 455/431, 436, 442  
See application file for complete search history.

(56) References Cited

U.S. PATENT DOCUMENTS

| 7,283,838 | B2 | 10/2007 | Lu et al. | |
|---|---|---|---|---|
| 7,463,622 | B2 | 12/2008 | Lu et al. | |
| 7,522,888 | B2 * | 4/2009 | Lu | 455/84 |
| 7,822,065 | B2 * | 10/2010 | Lu | 370/469 |
| 7,826,841 | B2 | 11/2010 | Lu et al. | |
| 7,899,451 | B2 | 3/2011 | Hu et al. | |
| 7,940,749 | B2 | 5/2011 | Lu et al. | |
| 8,233,408 | B2 * | 7/2012 | Lu et al. | 370/259 |
| 2005/0130611 | A1 * | 6/2005 | Lu et al. | 455/130 |
| 2007/0105589 | A1 * | 5/2007 | Lu | 455/556.2 |
| 2008/0228330 | A1 * | 9/2008 | Srinivasan et al. | 701/3 |
| 2009/0075654 | A1 * | 3/2009 | Lu et al. | 455/435.2 |
| 2009/0197595 | A1 * | 8/2009 | Kauffman et al. | 455/431 |
| 2009/0280858 | A1 * | 11/2009 | Ahn et al. | 455/550.1 |
| 2009/0318137 | A1 * | 12/2009 | Kauffman et al. | 455/428 |
| 2010/0112933 | A1 * | 5/2010 | Mueller et al. | 455/1 |
| 2010/0167723 | A1 * | 7/2010 | Soumier et al. | 455/431 |
| 2010/0189089 | A1 * | 7/2010 | Lynch et al. | 370/338 |
| 2010/0238840 | A1 * | 9/2010 | Lu et al. | 370/259 |
| 2011/0184607 | A1 * | 7/2011 | Beacham et al. | 701/35 |

* cited by examiner

*Primary Examiner* — Farah Faroul

(57) ABSTRACT

This invention relates to an Open Wireless Architecture (OWA) unified airborne and terrestrial communications architecture providing optimal high-speed connections with open radio transmission technologies (RTTs) between aircrafts and ground cells, and between different aircrafts in Ad-Hoc or Mesh network group, to construct the multi-dimensional unified information delivery platform across the airborne networks and the terrestrial networks wherein the same OWA mobile device or OWA mobile computer can be used seamlessly and continuously both in the aircrafts and on the ground.

20 Claims, 5 Drawing Sheets

FIG.3 OWA.inFlight Mobile Network

OWA.inFlight Mobile Access Control

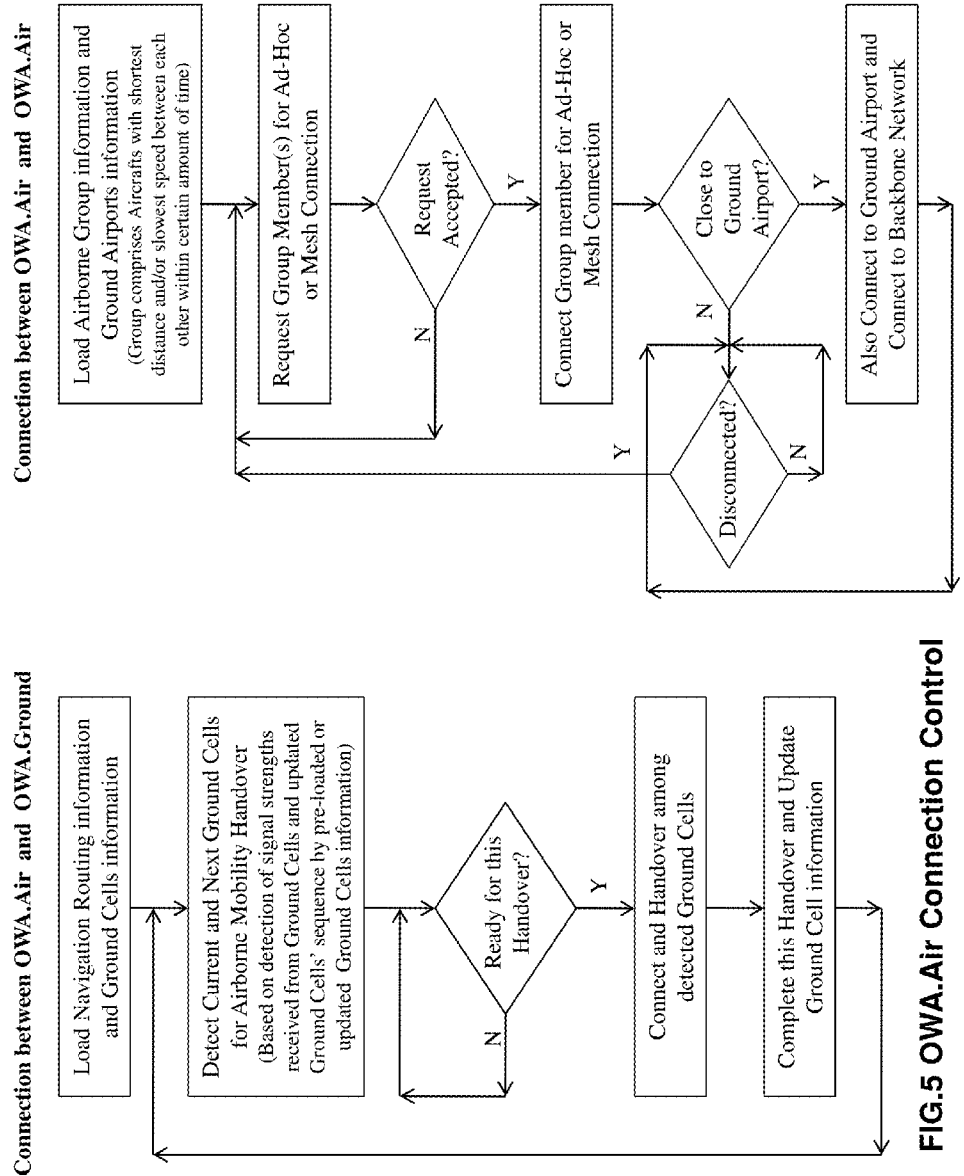
FIG.5 OWA.Air Connection Control

OPEN WIRELESS ARCHITECTURE (OWA) UNIFIED AIRBORNE AND TERRESTRIAL COMMUNICATIONS ARCHITECTURE

BACKGROUND OF THE INVENTION

1. Field of the Invention

This invention relates to an Open Wireless Architecture (OWA) Unified Airborne and Terrestrial Communications architecture with open radio transmission technologies between aircrafts and ground cells, and between different aircrafts in ad-hoc or mesh network manner to build the unified broadband information delivery platform across the airborne networks and the terrestrial networks wherein the same OWA mobile device can be used seamlessly and continuously both in the aircrafts and on the ground.

2. Description of the Related Art

Commercial wireless mobile communications including terrestrial cellular network and airborne network have been developed for long time. However, their architecture remains very closed, especially the airborne network technology is still in the earlier dates.

As the ground networking technology is expanding to the space domain which is to develop the next generation Internet technology for the ground-air infrastructure, a unified airborne and terrestrial networking solution becomes the mission-critical demand for everyone in the industry.

The current airborne communications have the following fatal problems:

a. Transmission speed is too slow, and both transmission and system architectures are too closed;
b. Too much relying on Satellite communications which are too expensive to be used in commercial environment;
c. It is too difficult to ensure the radio transmission safety issue for the traditional wireless device used in commercial aircrafts, and therefore all such wireless devices must be turned off in the aircrafts;
d. Some available non-satellite based transmission technology for airborne network is very much limited to certain specific wireless standard only without the capability to support the overall requirements of the future airborne communications;
e. There is no solution available for seamless connections across the terrestrial networks and the airborne networks.

The above problems exist in the prior arts as follows:

1. Satellite-Based Airborne Networks

This technology has been in the industry for about 50 years. However, satellite equipments both in aircrafts and skies are very expensive, and because of power issues in the satellite, the transmission speed is must limited which is not a cost-effective solution in providing broadband connections for users in the aircrafts. In addition, most commercial mobile devices do not support satellite communications except a purely broadcasting satellite receiver.

Commercial networks require both cost-effective and performance-efficient solution among the features of transmission speed, mobility handover and network capacity. Satellite network has problems in cost issue and transmission speed issue, and therefore is not appropriate for commercial applications.

2. Land-Based VHF/UHF Airborne Networks

This solution was proposed in 1960s for the airborne networks. However, VHF (very high frequency) and UHF (Ultra high frequency) are mostly used for terrestrial broadcasting (one way) services and there are not enough two-way transceivers on the ground. Furthermore, VHF/UHF has been already used by airline industry for airborne radio, navigation information and flight information mostly in the form of voice, text, fax and short video, etc. In addition, the transmission speed over VHF/UHF channel is quite limited, and not appropriate for broadband high-speed connections between the aircrafts and the ground.

3. Land-Based CDMA-EVDO Airborne Network

This solution was proposed by Aircell and other companies which use one CDMA (code division multiplex access) technology to connect the aircrafts with the ground cellular towers. Though the CDMA EVDO (Evolution-Data Optimized) standard has many cellular towers in some regions, this solution has the following two fatal problems:

a. The transmission is limited to EVDO-CDMA only without being able to connect to other wireless standards in different regions or countries without EVDO;
b. Because CDMA has many problems in maintaining the high network capacity and high-speed transmission, etc in the airborne communication environment, this single solution is hard to compliment between the network capacity and the transmission speed in a commercial environment;

Furthermore, in the above solution, there is no transmission safety control scheme in the airborne in-flight connections, and so various wireless equipments supporting WiMax and PCS, etc are used in the aircrafts which generate a serious radio interference problems with the airborne/aviation navigation and airborne/aviation communication systems. Such separate radio transmission technologies in the closed architecture without an efficient control will not work at all in the commercial airborne networks.

4. SDR Based Airborne Network

Software Defined Radio (SDR) technology was used for airborne network in 1990s which supports multiple wireless standards in the aircraft-ground connections. Though it has been used already by the military applications, it has never been used successfully in commercial environment, because:

a. SDR is primarily a radio in which the preset operating parameters including inter alia frequency range, modulation type, and/or output power limitations can be reset or altered by software in order to support different radio frequency bands and/or standards. Though SDR has been improved a lot to support re-configurability and flexibility, it is a closed architecture in coupling different radios into one broadband transceiver. In other words, SDR consumes much more power and spectrum in exchange of the system flexibility. From the business point of view, SDR is not a cost-effective solution in wireless communications;
b. Furthermore, SDR uses broadband transceiver to support multiple wireless standards which is very expensive in the commercial environment;
c. The SDR device will lose synchronization across the airborne network and the terrestrial network because of its closed architecture in both systems and transmissions.

Therefore, this solution is also not appropriate for the commercial airborne networks.

In conclusion, all of these known systems fail to meet one or more of the following goals for the airborne network connections:

a. To provide a cost effective way in securing high-speed transmission, lossless handover and high network capacity in a commercial environment;
b. To provide a seamless and continuous connection between the terrestrial network and the in-flight network;

c. To support open radio transmission technologies in different regions and service areas in both aircraft-to-ground and ground-to-aircraft links;

d. To synchronize the mobile device across the airborne network and the terrestrial network;

e. To provide a fully flight-safe connections for the in-flight wireless network and automatically turn-off the terrestrial radio transceivers of the mobile devices when in the in-flight network.

This invention provides a system and method that achieves these goals very well.

The present invention is based on a technology called Open Wireless Architecture (OWA) platform. OWA is different from SDR (software defined radio) as OWA basically maps various wireless standards into open interface parameters and maintain the system platform including RF, baseband, networks and applications an open architecture. Hence, in OWA systems, different modules (both hardware and software) can be from different vendors. It is similar to the open computer architecture in personal computer system and open network architecture in packet router system.

SDR uses broadband transceiver to support multiple wireless standards which is very expensive in the commercial environment. However, OWA converges multiple air interfaces (or called wireless standards or radio transmission technologies—RTTs) in an open system platform to maximize the transmission bandwidth and system performance, but each wireless transmission still uses the narrowband transceiver, therefore maintaining the system in a cost-effective way which is very important for the commercial business.

By using OWA technology, we can converge multiple wireless standards in one open system to support both broadband high-speed radio transmission and seamless fast mobility capability in a mobile fast-fading propagation model environment while maintaining the very high mobile network capacity for the commercial mobile business.

In addition, OWA allows allocating multiple air interfaces into an external card so that the users can simply change wireless standards by updating such air interface card without having to change the mobile device or mobile terminal system.

Based on the research report (released on Feb. 11, 2010) by Berkeley Wireless Research Center, University of California at Berkeley, three most important and critical issues in wireless communication terminal device are in power & energy, radio spectrum and open wireless architecture (OWA). As long as we have the OWA system, it can help improve the energy efficiency and spectrum efficiency greatly. This is extremely important for the future converged networks between the terrestrial network and the airborne network, and between the wireless access network and the mobile cellular network, and further between the wireless network and wireline network.

We will explain in more details in the following sections.

SUMMARY OF THE INVENTION

An object of the invention is to overcome at least some of the drawbacks relating to the compromise designs of prior art systems and methods as discussed above.

In order to solve the problems existed in the conventional airborne communications, and meet the goals as discussed, improvement of the current wireless transmission and system architecture is the only and final solution. The Open Wireless Architecture (OWA) approach has been proposed to achieve the above goals and shifted the wireless mobile technology from a transmission-specific radio system to an interface-based open system platform for the complete openness and simplicity of the future unified wireless terrestrial and airborne communications. Systems and Methods that detail the implementation of the OWA technology are provided in the commonly owned U.S. Pat. No. 7,826,841 (OWA System on Chip), U.S. Pat. No. 7,283,838 (OWA Baseband Processing), U.S. Pat. No. 7,822,065 (OWA MAC), U.S. Pat. No. 7,463,622 (OWA Incoming Network Access), U.S. Pat. No. 7,940,749 (OWA Outgoing Network Access), U.S. Pat. No. 7,899,451 (OWA Infrastructure) and U.S. Pat. No. 7,522,888 (OWA Radio Transceiver), which are herein incorporated in their entireties.

This invention discloses a new architecture in converging the terrestrial cellular networks and the airborne communication networks seamlessly and adaptively by utilizing the OWA technology, and enables an OWA-based mobile device being used continuously and seamlessly in both the terrestrial networks and the airborne networks with optimal transmission performance between the aircraft and the ground, and in the airborne in-flight network.

The present invention mainly comprises the following disclosures:

1. OWA technology allows open radio transmission technologies (RTTs) for both Up-Link (from ground to aircraft) connection and Down-Link (from aircraft to ground) connection by implementing the patented OWA transceiver technology in both OWA.Air Transceivers in the aircrafts and OWA.Ground Transceivers in the Ground Cells (or called ground cellular base stations in some cellular networks). This open RTT approach is very important for airborne communications because different regions and/or countries use different RTTs for the terrestrial cellular networks, and the aircrafts may fly across such different regions with different RTTs. For example, North America may use cdma2000 (code division multiplex access) family RTT and/or OFDM (orthogonal frequency division multiplex) family RTT while Asia may use TD-SCDMA (time-division synchronized code division multiplex access) family RTT and/or WCDMA (wideband code division multiplex access) family RTT for the terrestrial cellular networks. Even in the same country, different regions may use different RTTs in terrestrial networks.

2. OWA technology allows open radio transmission technologies (RTTs) for mobile devices or mobile computers to connect to the available networks seamlessly and continuously both in the aircrafts and on the ground. The Mobile Users with OWA mobile devices or computers do not have to turn off their devices or computers when on board the aircrafts because the OWA.inFlight protocol will automatically switch the OWA device to the flight-safe In-Flight mode fully in compliance with the airborne regulations and guidelines. As long as the aircrafts leave the airport gate, the In-Flight Pilot signal received by the OWA mobile device or computer will immediately turn off all the terrestrial radio transceivers in the device or computer and switch to the In-Flight mode accordingly before connecting to the in-flight mobile network fully in compliance with the airborne regulations.

3. OWA technology enables the airborne mobile handover between the aircraft and the ground cells seamless and lossless because the airborne navigation information and the ground cells' information are predictable and well planned in advance, and hence the aforementioned OWA.Air Transceivers and OWA.Ground Transceivers can always find the best possible RTT for both the Up- Link and Down-Link connections well before the handover occurring. In different regions or same region with different weather or different situations, the air-ground connections (Up-Link and/or Down-Link) may need different or multiple RTTs dynamically or adaptively to optimize the transmission bandwidth or performance, and therefore OWA technology is the best solution to fulfill this requirement. Meanwhile, the air-ground connections may be unbalanced in Up-Link and Down-Link, for example, if most uses in the aircraft browse the websites through Internet, the Up-Link traffics are much more than Down-Link traffics, and in this situation, the aforementioned OWA.Ground Transceivers need to use high-speed broadband RTT to connect the aforementioned OWA.Air Transceivers in the Up-Link channels. In addition, during airborne mobile handover process and high-speed connection period, but not limited thereto, the aforementioned OWA.Ground Transceivers will use antenna beam-forming technology to send strong narrow beams in connecting the aforementioned OWA.Air Transceivers of the aircraft for the optimized connections between the aircraft and the ground cells. The aforementioned OWA.Ground Transceivers also utilize advanced space-time antenna array technology, etc to maximize the receiving performance and transmitting performance for the airborne links, for example, but not limited thereto, the distributed MIMO (multiple-in multiple-out) with multiple antennas.
4. OWA technology enables same or different radio transmission technologies (RTTs) in Up-Link and Down-Link, as set forth above, to maximize the transmission efficiency and performance in different commercial environments because in some regions the wireless spectrum availability in either links may be different, and the available RTTs in either links may also be different.
5. OWA technology enables one aircraft to connect to another aircraft in an Ad-Hoc or Mesh network group through the aforementioned OWA.Air Transceivers. The Ad-Hoc or Mesh network group comprises the aircrafts with the shortest distance and/or slowest speed between each other within certain amount of time, and this group is updated frequently at certain interval. If any group aircraft is close to a ground airport, either before landing or passing by, this aircraft equipped with the aforementioned OWA.Air Transceivers will connect the Ad-Hoc or Mesh network to the ground airport to relay or dispatch the airborne in-flight information and traffics to the ground network and vice verse. The aforementioned Ad-Hoc or Mesh network can construct the broadband airborne information delivery highway among the group aircrafts and build the cost-effective airborne networks because there are lots of aircrafts flying in the same flight routes every day across the country and on the worldwide basis. This solution is very useful for the airborne network connections especially when the aircrafts are flying over the ocean where there are no ground cells available for the ground connection, but there is always at least one group member aircraft close to an airport in the same Ad-Hoc or Mesh group, either before landing, after take-off or passing by. Any OWA.Air Transceiver, as set forth above, supports multiple RTTs in one system based on OWA technology, and can adaptively connect to other OWA.Air Transceiver in other aircraft with optimal RTT connection(s) in different environments.
6. OWA technology enables the Virtual Mobile Server (VMS) on the ground to synchronize and manage the OWA mobile devices or computers, as set forth above, between the terrestrial mode and the in-flight mode when mobile users travel across airborne networks and terrestrial networks, and to support OWA Mobile Cloud architecture so that many processing tasks and/or modules can be moved from the OWA mobile devices or computers to the OWA VMS, as set forth above. This is important to make the future mobile device or mobile notebook simple to use and simple to operate, and optimize its transmission and system performance including power efficiency, spectrum efficiency and cost effectiveness.
7. OWA technology enables the OWA mobile devices or mobile notebooks connecting to the OWA.onBoard wireless router and access point in a flight-safe In-Flight wireless network supporting these safe in-flight RTTs:
   a. Standard wireless local area network (WLAN) with reduced and lowest possible transmitting power for airborne in-flight connection, fully monitored and controlled at all times by the aforementioned OWA.onBoard Wireless Router and Access Point to avoid any frequency interference with any aviation communication and navigation systems,
   b. Modified wireless local area network for airborne in-flight connection (WLAN.Air) which is completely in compliance with the airborne communication regulations and guidelines,
   c. Standard wireless personal access network or personal area network (WPAN) with reduced and lowest possible transmitting power for airborne in-flight connection, fully monitored and controlled at all times by the aforementioned OWA.onBoard Wireless Router and Access Point to avoid any frequency interference with any aviation communication and navigation systems, and
   d. Modified wireless personal access network for airborne in-flight connection (WPAN.Air) which is completely in compliance with the airborne communication regulations and guidelines.
The search order of the connection modes between the OWA.inFlight Mobile Device/Notebook (same aforementioned OWA mobile device or notebook in the in-flight mode) and the OWA.onBoard Wireless Router and Access Point, as set forth above, can be re-configured or re-set by the mobile users or the aircrafts. By default, the search order is by WLAN.Air, WPAN.Air, WLAN, WPAN, Wireline.
The aforementioned OWA.onBoard Wireless Router and Access Point manages and monitors the aforementioned flight-safe RTTs to ensure there is no frequency interference with the aircraft/aviation communication and navigation systems.

Based on our long-time research on wireless transmissions and seamless mobility management, no SINGLE wireless standard (or call radio transmission technology—RTT) can support both broadband high-speed transmission and seamless mobility in a commercial environment, and therefore the broadband transmission, seamless mobility and network capacity are the three contradictory elements in a SINGLE wireless RTT of commercial environment. To meet all these three requirements, we need to converge multiple wireless standards (or RTTs) on an open platform in both transmission level and system level, and therefore, the Open Wireless Architecture (OWA) technology was proposed and developed.

The OWA technology is extremely important for the unified terrestrial and airborne communications in terms of spectrum efficiency, transmission efficiency, energy efficiency, performance efficiency as well as cost-effectiveness in a commercial environment.

The details of the present invention are disclosed in the following drawings, descriptions as well as the claims based on the abovementioned elements.

The various aspects, features and advantages of the disclosure will become more fully apparent to those having ordinary skill in the art upon careful consideration of the following detailed description thereof with the accompanying drawings described below.

BRIEF DESCRIPTION OF THE DRAWINGS

For the full understanding of the nature of the present invention, reference should be made to the following detailed descriptions with the accompanying drawings in which.

Like reference numerals refer to like parts throughout the several views of the drawings.

DESCRIPTION OF THE PREFERRED EMBODIMENT

The present inventions now will be described more fully hereinafter with reference to the accompanying drawings, in which some examples of the embodiments of the inventions are shown. Indeed, these inventions may be embodied in many different forms and should not be construed as limited to the embodiments set forth herein; rather, these embodiments are provided by way of example so that this disclosure will satisfy applicable legal requirements. Like numbers refer to like elements throughout.

The present invention relates to an Open Wireless Architecture (OWA) unified airborne and terrestrial communication networks providing optimal high-speed connections with open radio transmission technologies (RTTs) between aircrafts and ground cells, and between different aircrafts in Ad-Hoc or Mesh group, to construct the multi-dimensional unified information delivery platform across the airborne networks and the terrestrial networks wherein the same OWA mobile device or OWA mobile computer can be used seamlessly and continuously both in the aircrafts and on the ground.

Figure 1:
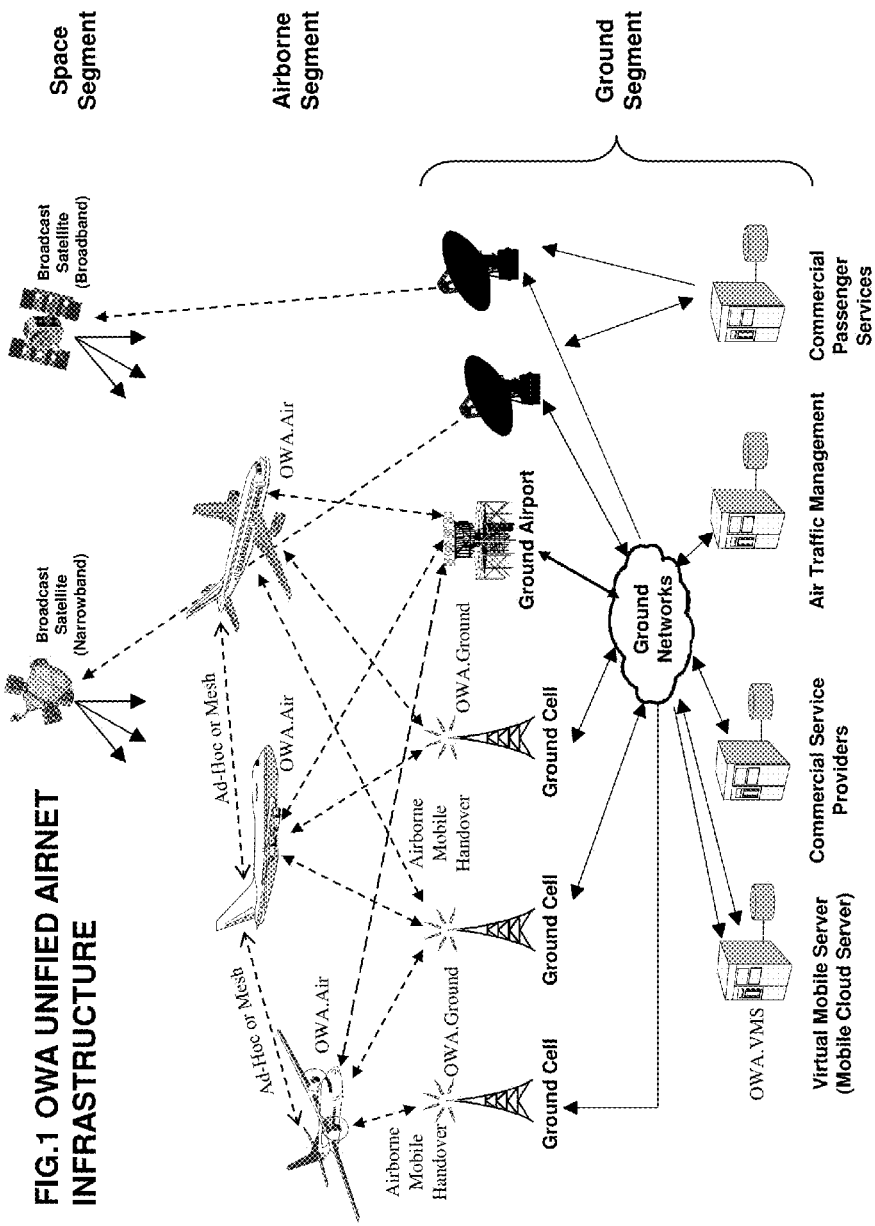
FIG. 1 is an Open Wireless Architecture (OWA) Unified Airborne Network (AirNet) Infrastructure.

FIG. 1 describes the Open Wireless Architecture (OWA) Unified Airborne and Terrestrial Networking Infrastructure. The airborne connections have two different ways:

1. The moving aircrafts, equipped with OWA.Air Transceivers, connect to the Ground Cell towers with OWA.Ground Transceivers through the Airborne Mobile Handover protocol. Since the aircraft navigation routes are predictable and pre-loaded in the airborne system, and the ground cells' information is also known in advance, this airborne mobile handover is actually well planned when in flight.
2. Furthermore, because the airborne handover is fully predictable, the associated ground cells of handover will be able to form the narrow antenna beams well in advance and prepare for handover in an optimal way to maximize the transmission throughput.

In addition, the aircrafts may use space-time technologies of multiple antennas to connect the ground cells for the high-speed broadband transmission.

OWA technology allows open radio transmission technologies between the ground cells and the aircrafts so that the Up-Link (from ground to aircraft) and Down-Link (from aircraft to ground) connections are always optimized.
3. The moving aircraft, equipped with aforementioned OWA.Air Transceivers, connects to other moving aircraft with aforementioned OWA.Air Transceivers in an Ad-Hoc or Mesh network topology, to construct the broadband high-speed transmission channels as the Over-the-Air Information Delivery and Relay Platform.

The Ad-Hoc or Mesh group comprises the aircrafts with the shortest distance and/or slowest speed between each other within certain amount of time, and the group is updated frequently at certain interval.

If the moving aircraft is close to a ground airport, either after take-off, before landing or passing by, this moving aircraft, equipped with the aforementioned OWA.Air Transceiver, further connects to the assigned ground airport by separate OWA aircraft-ground links, to connect the Ad-Hoc or Mesh network with the ground backbone network and dispatch the airborne traffics to the ground network, and vice verse.

Again, OWA technology allows open radio transmission technologies between the moving aircrafts of the Ad-Hoc or Mesh group, and between the moving aircraft and its assigned ground airport, to maximize the broadband high-speed transmissions over the Air Link.

By utilizing the above integrated high-speed transmissions, the unified air networks (called AirNet) are established, and the bandwidth of the aircrafts with the aforementioned OWA.Air Transceivers can be optimized.

The Broadcast Satellite, though not required for this OWA unified AirNet, can be helpful in updating the ground cells information, ground airports information and the airborne navigation routing information, etc.

The ground Virtual Mobile Server (VMS) is utilized to support the OWA Mobile Cloud infrastructure where any mobile users' information in the AirNet can be synchronized in this VMS. In addition, many processing tasks including signal processing and application processing can be done in this VMS as well.

Both OWA.Air transceivers and OWA.Ground transceivers, as set forth above, support open radio transmission technologies (RTTs) in a spectrum-efficient, bandwidth-optimal and cost-effective way, wherein the RTTs include Code Division Multiplex Access (CDMA), Time Division Multiplex Access (TDMA), OFDMA (Orthogonal Frequency Division Multiplex Access), SDMA (Space Division Multiplex Access) and their combinations, etc, but not limited thereto.

Figure 2:
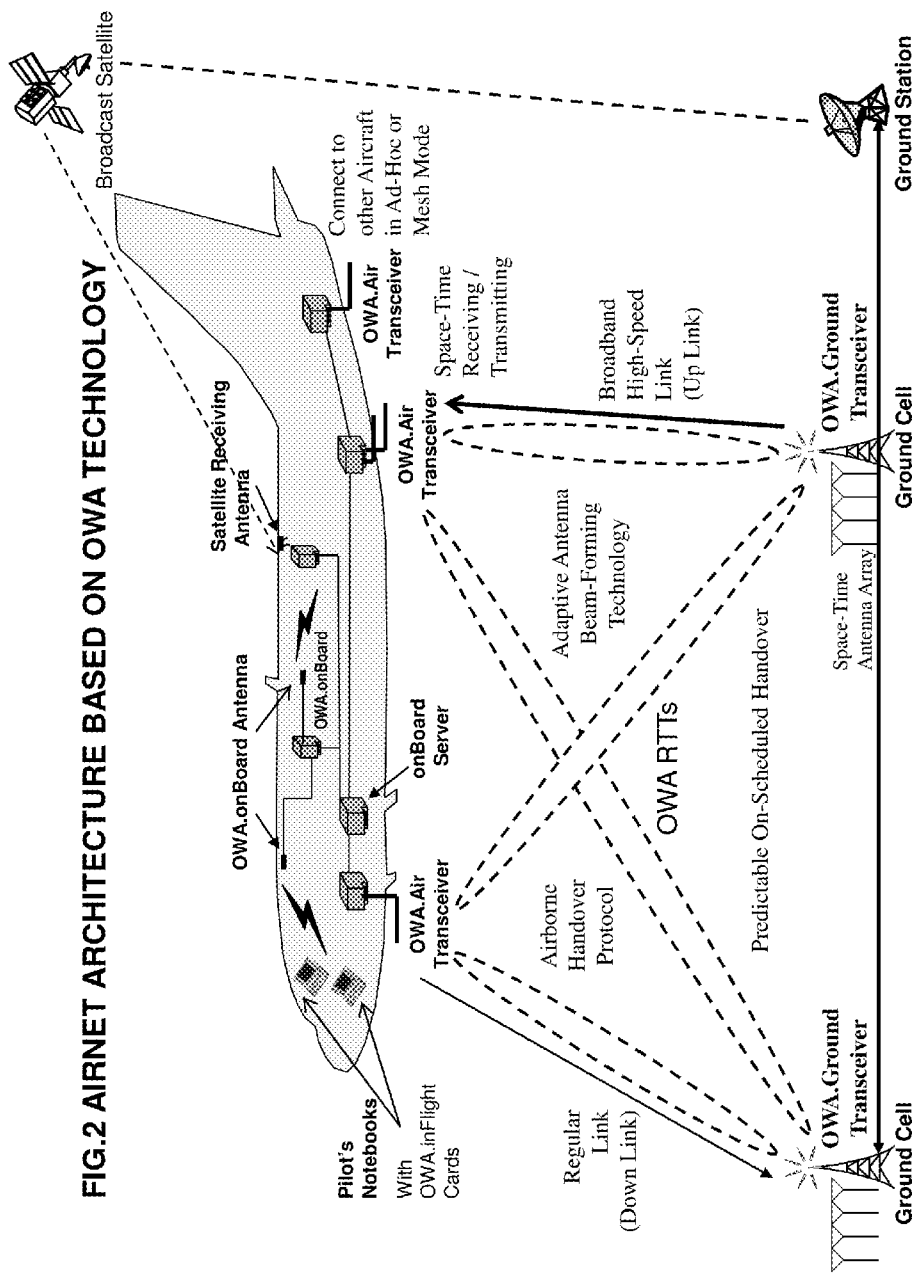
FIG. 2 is a detailed AirNet Architecture based on OWA technology, FIG. 3 introduces the OWA.inFlight Mobile Network in the aircraft cabins, FIG. 4 discloses the OWA.inFlight Mobile Access Control method, and FIG. 5 describes the detailed OWA.Air Connection Control method for the airborne networks.

FIG. 2 illustrates the detailed AirNet architecture based on OWA technology. The aforementioned OWA.Air Transceivers in the aircrafts can not only connect to the aforementioned Ground Cells with aforementioned OWA.Ground Transceivers, but also connect to other aircrafts in Ad-Hoc or Mesh network mode. Hence, each aircraft has multiple aforementioned OWA.Air Transceivers installed for such multi-dimensional AirNet connections.

Inside the aircraft cabins, the information received by aforementioned OWA.Air Transceivers from the aforementioned Ground Cells or Ad-Hoc/Mesh network will be routed to the in-flight mobile users (in-flight Passengers) through the OWA.onBoard Wireless Router and Access point, and vice verse.

The aforementioned OWA.Air Transceivers in the aircrafts support open radio transmission technologies (RTTs) in a spectrum-efficient and bandwidth-optimized way, wherein the RTTs include Code Division Multiplex Access (CDMA), Time Division Multiplex Access (TDMA), OFDMA (Orthogonal Frequency Division Multiplex Access), SDMA (Space Division Multiplex Access) and their combinations, but not limited thereto. The aforementioned OWA.Air Transceivers can also enable different RTTs in the Up-Link (from ground to aircrafts) and Down-Link (from aircrafts to ground) channels subject to spectrum, service and specific transmission requirements, but not limited thereto.

The aforementioned OWA.onBoard Wireless Router and Access Point support the low-power and flight-safe wireless local area network (WLAN) and/or wireless personal access network (or called personal area network) (WPAN) so that the in-flight mobile users can access to the OWA.onBoard Wireless Router and Access Point, as set forth above, wirelessly and seamlessly inside the aircraft cabins. The aforementioned in-flight wireless network by aforementioned WLAN and/or WPAN is fully controlled and monitored by aforementioned OWA.onBoard Wireless Router and Access Point to avoid any frequency interference with any aviation communication and navigation systems.

The Up-Link from the Ground Cells to the Aircrafts is a broadband high-speed link wherein the Ground Cells' Transceivers, as set forth above, form the narrow beams adaptively with strong transmitting powers and directional antennas (or antennas array) to connect to the associated OWA.Air Transceivers, as set forth above, to construct the very high-speed transmission link. In comparison, the Down-Link from the Aircrafts to the Ground Cells is a regular transmission link because most of the transmission traffics are in the Up-Link direction.

In order to increase the transmission bandwidth and optimize the link performance in both directions (Up-Link and Down-Link), many Space-Time transmission processing technologies (such as Multiple-In Multiple-Out, but not limited thereto) can be utilized in both the OWA.Air Transceivers and the OWA.Ground Transceivers, as set forth above.

The Airborne mobile handover among multiple Ground Cells is based on preloaded navigation routing information and Ground Cells information, and therefore, the aforementioned airborne connection handover is predictable and well planned. This kind of predictable and on-schedule handover can optimize the AirNet connections more effectively and more stably.

The Broadcast Satellite can help broadcast useful Ground information and navigation information, etc for the Airborne networks (AirNet), and help adjust the Airborne Mobile Handover protocol as well as update the Ad-Hoc or Mesh network information with other aircrafts in the same Airborne Group.

The OWA.Ground Transceiver, as set forth above, is a modified terrestrial cellular transceiver system based on OWA platform which can support any cellular radio transmission technology (RTT) including CDMA, TDMA, OFDMA and SDMA, etc, as set forth above. The aforementioned OWA.Ground Transceivers are equipped with Beam-forming technologies and/or advanced antenna array technologies to generate the strong narrow beams in connecting the airborne OWA.Air Transceivers, as set forth above, to construct the aforementioned broadband high-speed Up-Link.

In the regular Down-Link from the OWA.Air Transceivers to the OWA.Ground Transceivers, as set forth above, the aforementioned OWA.Ground Transceiver increases its receiving sensibility by utilizing space-time receiving technologies such as antenna array or distributed MIMO (multiple-in multiple-out) with multiple antennas, but not limited thereto, and maximize its receiving performance across one or multiple OWA.Ground Transceivers, as set forth above.

Because both the Up-Link and the Down-Link use the patented OWA transceiver technology (U.S. Pat. No. 7,522,888, Application No. 20080146178 and so on, etc), the AirNet wireless transmission performance can be optimized and the spectrum efficiency is therefore maximized, especially for the future open spectrum management strategy as well as spectrum sharing, spectrum sensing and/or spectrum recycling strategies.

Based on our long-time research on wireless transmissions and seamless mobility management, no SINGLE wireless standard (or call radio transmission technology—RTT) can support both broadband high-speed transmission and seamless mobility in a commercial environment, and therefore the broadband transmission, seamless mobility and network capacity are the three contradictory elements in a SINGLE wireless RTT of commercial environment. To meet all these three requirements, we need to converge multiple wireless standards (or RTTs) on an open platform in both transmission level and system level, and therefore, the Open Wireless Architecture (OWA) technology was proposed and developed.

In a commercial AirNet environment, the wireless transmission link between the aircraft and the ground cell is very high-speed, and the aircrafts move very fast. Furthermore, the aircrafts may fly over many different regions with different RTTs (or wireless standards) in the terrestrial cellular networks. Hence, the OWA technology is the best solution to converge various RTTs in an optimal way for the best wireless connections between the Aircrafts and the Ground Cells, as set forth above, to construct the open AirNet architecture which can be applied in any commercial airborne communication environment.

Figure 3:
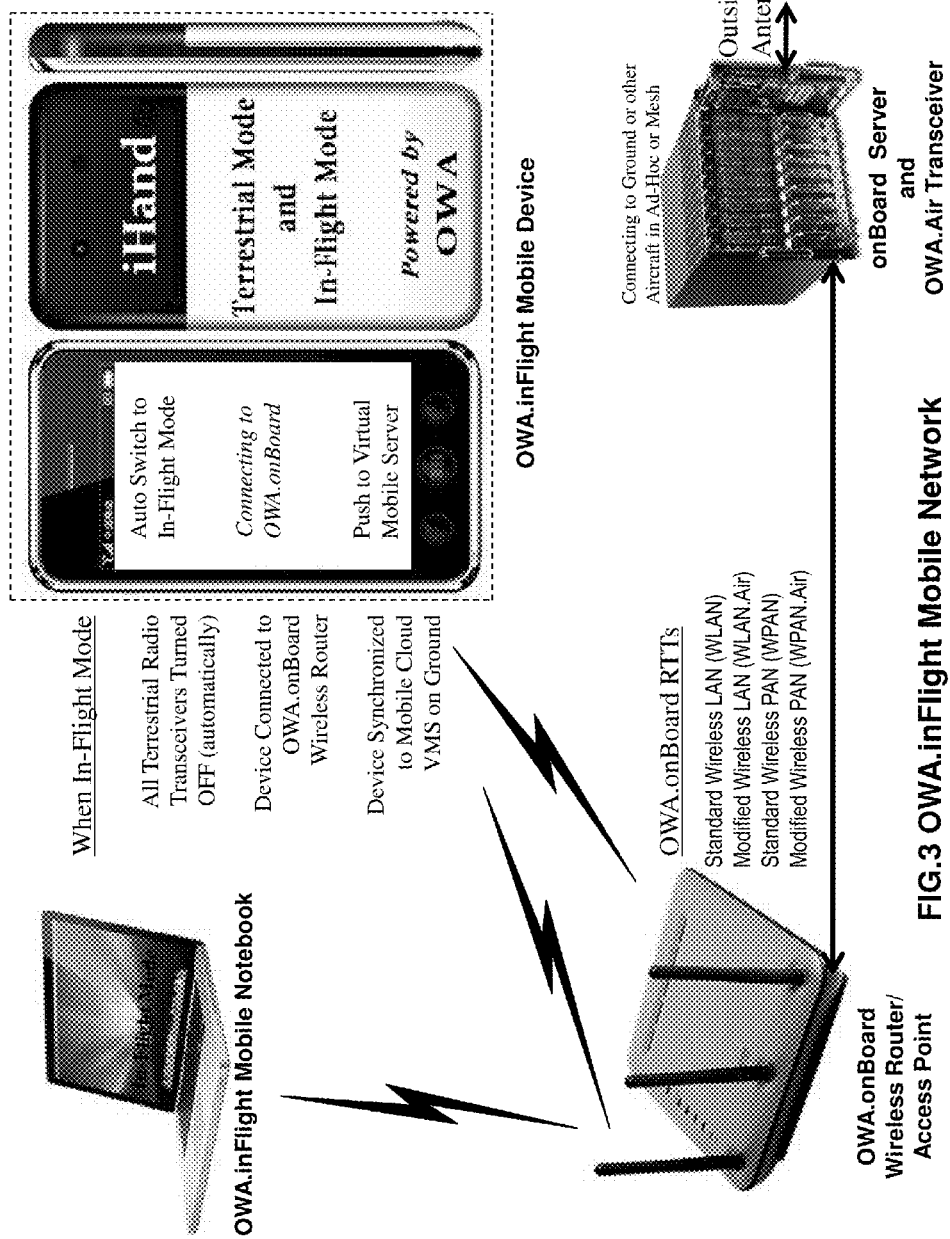

FIG. 3 introduces an OWA-based In-Flight Mobile Network which comprises the following:

1. OWA.onBoard Wireless Router and Access Point, the on-board wireless base station and wireless router to connect and manage the In-Flight mobile handheld devices and mobile notebooks through the wireless channels. The OWA.onBoard Wireless Router and Access Point, as set forth above, connects to the aforementioned OWA.Air Transceiver of the aircraft which further connecting to the Ground Cells or other Aircrafts in Ad-Hoc or Mesh network.

2. OWA.inFlight Mobile Device supporting both terrestrial and In-Flight communication modes based on OWA platform. Whenever the OWA Mobile Device receives the In-Flight Pilot Signal of the aircraft, it automatically turned off the terrestrial radio transceivers, and switch to the In-Flight mode immediately. The aforementioned OWA.inFlight Mobile Device then connects to the OWA.onBoard Wireless Router and Access Point, as set forth above, to establish the in-flight broadband connections. In the same or similar way, the OWA.inFlight Mobile Notebooks connect to the aforementioned OWA.onBoard Wireless Router and Access Point for the in-flight broadband wireless connections.

3. OWA.Air Transceiver and onboard Server caching the In-Flight users' information and forwarding the In-Flight broadband information and traffics to the Ground Networks or other Aircrafts in the Ad-Hoc or Mesh network, as set forth above.

The OWA.onBoard Wireless Router and Access Point, as set forth above, supports the following radio transmission technologies (RTTs):
1. Standard wireless local area network (WLAN) with reduced and lowest transmitting power for in-flight application;
2. Modified wireless local area network for Airborne applications (WLAN.Air) which is completely in compliance with the airborne communication regulations and guidelines;
3. Standard wireless personal access network (WPAN) with reduced and lowest transmitting power for in-flight applications;
4. Modified wireless personal access network for Airborne applications (WPAN.Air) which is completely in compliance with the airborne communication regulations and guidelines.

When the aforementioned OWA.inFlight Mobile Device or Mobile Notebook is in In-Flight mode, it performs the following tasks immediately:
1. All terrestrial radio transceivers in the OWA.inFlight Mobile Device and/or Mobile Notebook are turned OFF automatically;
2. OWA.inFlight Mobile Device and/or Mobile Notebook is connected to OWA.onBoard Wireless Router and Access Point;
3. OWA.inFlight Mobile Device and/or Mobile Notebook are synchronized to the OWA Mobile Cloud VMS (Virtual Mobile Server) on the Ground. The aforementioned VMS is utilized to be the virtual secretary for the mobile users in both the terrestrial and the in-flight applications based on the OWA technology platform, and multiple OWA mobile devices can share the same VMS on the Ground, as set forth above.

During In-Flight mode, the aforementioned OWA.inFlight Mobile Device can push any information to the aforementioned VMS, or retrieve any information from the aforementioned VMS. In this way, the OWA mobile device is fully synchronized between the terrestrial mode and the in-flight mode when the mobile users travel across the airborne networks and the terrestrial networks.

By using OWA Mobile Device of unified terrestrial and in-flight modes, the mobile users can continue seamless communications from the Ground networks to the Airborne networks, and from the Airborne networks to the Ground networks. Furthermore, the OWA.inFlight Mobile Device, as set forth above, is in full compliance with the airborne regulations on safety and security, and the users (or passengers) do not have to turn off the mobile devices when on board the aircrafts.

As mobile device becomes the most important communication and information equipment on the worldwide basis, the aforementioned unified terrestrial and in-flight OWA mobile device will drive this future direction in delivering the truly service-oriented information to the mobile users anywhere, anytime and with anyone.

Figure 4:
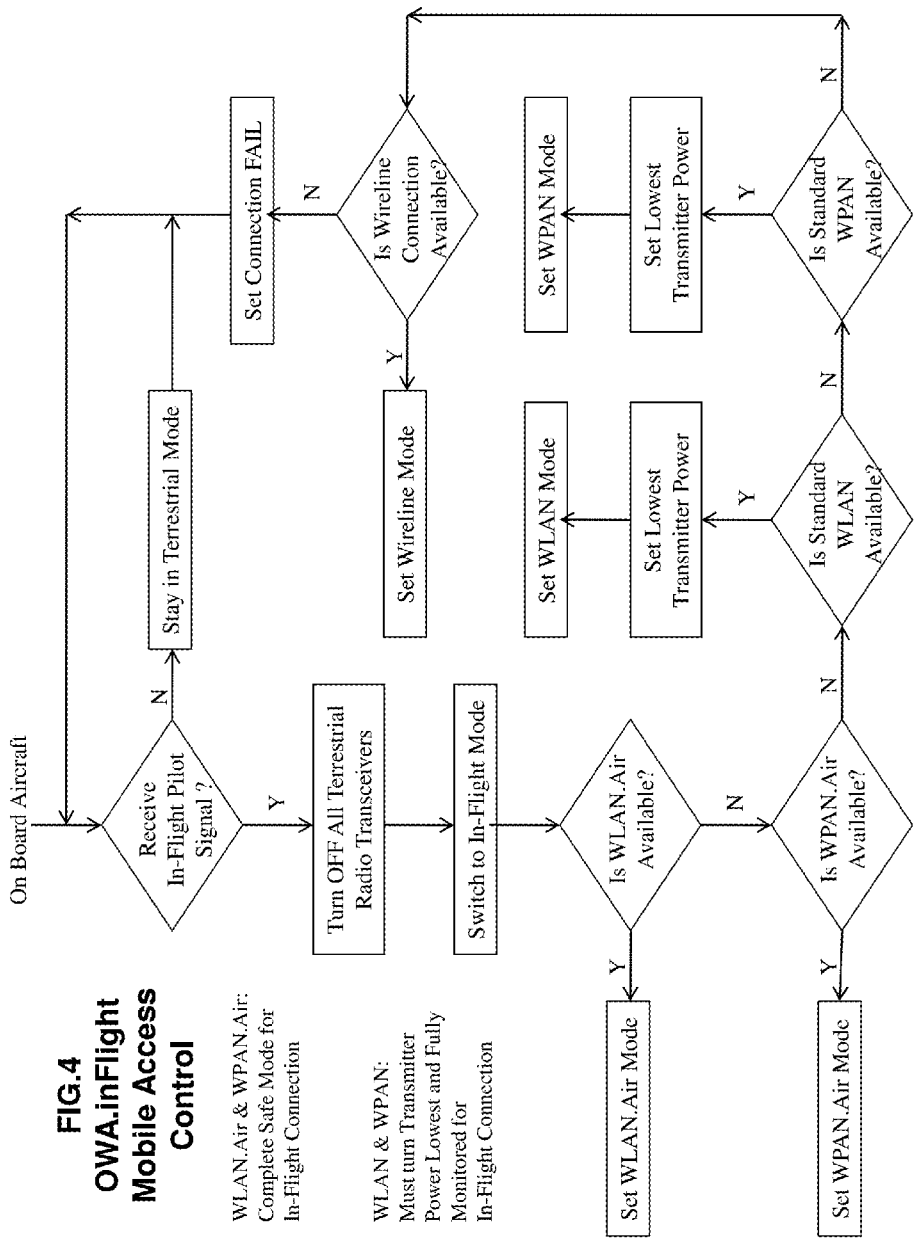

FIG. 4 discloses the access control method of the OWA.inFlight Mobile Device in the aircraft of the Airborne network.

After the users get on board in the aircraft, and the aircraft gets ready for takeoff or in flight (or by some airborne regulations, as long as the aircraft leaves the airport Gate), an In-Flight Pilot Signal will be broadcasted to all the OWA mobile devices or mobile notebooks in the aircraft cabins.

If the OWA Mobile Device does not receive the aforementioned In-Flight Pilot Signal, it remains in the Terrestrial mode with the Ground cellular networks. Otherwise, the aforementioned OWA Mobile Device immediately turns off all the terrestrial radio transceivers of the device, and switch to the In-Flight Mode accordingly.

When in the In-Flight mode, the aforementioned OWA.inFlight Mobile Device checks whether the WLAN.Air radio transmission technology (RTT), as set forth above, is available for the in-flight connection. If available, the aforementioned OWA.inFlight Mobile Device is set in the aforementioned WLAN.Air connection mode, otherwise, it further checks whether the WPAN.Air radio transmission technology (RTT), as set forth above, is available for the in-flight connection. If available, the aforementioned OWA.inFlight Mobile Device is set in the aforementioned WPAN.Air connection mode.

If both the WLAN.Air and WPAN.Air RTTs, as set forth above, are not available for the in-flight connection, the aforementioned OWA.inFlight Mobile Device further searches the standard WLAN radio transmission technology (RTT) or standard WPAN radio transmission technology (RTT). If either of them is available, the aforementioned OWA.inFlight Mobile Device first reduces its radio transmitting power of the aforementioned RTT to the minimal level, then connects to the OWA.onBoard Wireless Router and Access Point, as set forth above, in the aforementioned RTT connection mode.

If all the WLAN.Air, WPAN.Air, WLAN, WPAN RTTs, as set forth above, are not available for the in-flight connection, the aforementioned OWA.inFlight Mobile Device also supports the wireline connection mode by plugging into the OWA.onBoard Wireless Router and Access Point, as set forth above, through a networking cable or other forms of wiring in the aircraft.

If all of the aforementioned connections are failed, the aforementioned OWA.inFlight Mobile Device will restart the access control again from the beginning.

It is emphasized that, as long as the aircraft leaves the airport Gate (in flight, taxing, taking-off, landing), the In-Flight Pilot Signal, as set forth above, remains ON and continues broadcasting to all the OWA mobile devices or mobile notebooks in the aircraft cabins. Therefore, the aforementioned OWA.inFlight Mobile Device maintains in the In-Flight Mode all the time.

Only after the aircraft returns back and stop completely to the airport Gate, the aforementioned In-Flight Pilot Signal can be turned off, and so the aforementioned OWA.inFlight Mobile Device can be switched back to the Terrestrial mode for the ground cellular networks.

Based on different airborne regulations and rulings in different regions, the time to release or turn-off the aforementioned In-Flight Pilot Signal may vary. However, for airborne safety consideration, we strongly suggest to turn off the aforementioned In-Flight Pilot Signal after completely returning to the airport gate.

The search order of the connection modes between the OWA.inFlight Mobile Device and the OWA.onBoard Wireless Router and Access Point, as set forth above, can be re-configured or re-set by the mobile users or the aircrafts. By default, the search order is by WLAN.Air, WPAN.Air, WLAN, WPAN, Wireline, as set forth above.

The aforementioned WLAN.Air and WPAN.Air are the completely safest modes for the In-Flight connection. The aforementioned WLAN and WPAN modes must turn the radio transmitting power to be the lowest possible in compliance with the airborne regulations, and must be fully monitored at all times for the In-Flight connection.

The aforementioned OWA.onBoard Wireless Router and Access Point manages and monitors the aforementioned flight-safe RTTs to ensure there is no frequency interference with the aircraft communication and navigation systems.

The aforementioned In-Flight Pilot Signal is broadcasted to the OWA Mobile Device through a separate broadcasting channel by certain short-distance radio broadcasting technology in the airborne cabins or aircrafts.

FIG. 5 discloses the OWA.Air Connection Control for the Airborne communication networks. There are two different OWA.Air connection methods:

1. Connection Between OWA.Air and OWA.Ground

The aforementioned OWA.Air (OWA.Air Transceiver and its controller) loads the aircraft navigation routing information and the Ground Cells information. Then, the aforementioned OWA.Air detects the current and next Ground Cells for the airborne mobility handover control based on the detention of signal strengths received from the Ground Cells and the updated Ground Cells' sequence by pre-loaded or updated Ground Cells information. When the moving aircraft is ready for handover, the aforementioned OWA.Air transceivers connect and handover among the detected Ground Cells accordingly. After this handover is completed, the aforementioned OWA.Air updates the Ground Cells information for the next handover to come, and repeats the above steps again.

Because the airborne mobility handover is predictable and fully on-schedule, both the Up-Link (from ground to aircraft) and Down-Link (from aircraft to ground) connections of the Airborne Networks can be seamless and lossless during the handover period.

Furthermore, by utilizing advanced space-time transmitting and receiving technologies (such as space diversity, antenna arrays, smart antennas and Multiple-In Multiple-Out antenna technologies, but not limited thereto) in OWA.Air Transceivers and/or OWA.Ground Transceivers, as set forth above, the aforementioned Up-Link and Down-Link connection bandwidth can be maximized and optimized which absolutely improves the airborne network performance.

Furthermore, the OWA.Ground Transceivers, as set forth above, actively and adaptively send strong narrow beams to the associated OWA.Air Transceivers, as set forth above, based on the advanced antenna beam-forming technology, to ensure the broadband high-speed connections in the aforementioned Up-Link channels.

Again, OWA technology allows open radio transmission technologies between the ground cells and the aircrafts so that the Up-Link (from ground to aircraft) and Down-Link (from aircraft to ground) are always optimized.

Further, OWA technology enables same or different radio transmission technologies (RTTs) in Up-Link and Down-Link, as set forth above, to maximize the transmission efficiency and performance in different commercial environments because in some regions the wireless spectrum availability in each link may be different, and the available RTTs in each link may also be different, but not limited thereto.

In addition, in order to combat and overcome the Doppler effect (or Doppler shift) and/or transmission delay for the fast moving aircrafts, the aforementioned OWA.Ground Transceivers can perform additional transmission processing by using antenna calibration technology and/or signal processing technology on the ground.

2. Connection Between OWA.Air and OWA.Air in Different Aircrafts

The aforementioned OWA.Air (OWA.Air Transceiver and its controller) in one aircraft loads the Airborne Group (Ad-Hoc or Mesh network Group) information and the Ground Airports information, where the aforementioned Airborne Group comprises the aircrafts with the shortest distance and/or slowest speed between each other within certain amount of time, and the group is updated frequently at certain interval.

The aforementioned OWA.Air in one aircraft then requests the aforementioned Group member(s) for Ad-Hoc network connection or mesh network connection based on the different airborne networks topology in different regions. The aforementioned OWA.Air keeps sending such request until it is accepted by one new Group Member, as set forth above.

Then, the aforementioned OWA.Air in one aircraft connects the aforementioned new Group Member for Ad-Hoc or Mesh network connection.

If the moving aircraft is close to a ground airport, either after take-off, before landing or passing by, this moving aircraft, equipped with the aforementioned OWA.Air Transceiver, further connects to the assigned ground airport by separate OWA aircraft-ground links, to connect the Ad-Hoc or Mesh network with the ground backbone network and dispatch the airborne traffics to the ground network, and vice verse.

Again, OWA technology allows open radio transmission technologies between the moving aircrafts of the Ad-Hoc or Mesh group, and between the moving aircraft and its assigned ground airport, to maximize the broadband high-speed transmissions over the Air Link.

The aforementioned airborne Ad-Hoc or Mesh networks with OWA.Air Transceivers, as set forth above, provide an optimal way to construct the Over-the-Air high-speed information delivery and information relay platform for the airborne communication networks which can also be utilized to build the next generation network or Internet technology fully converging the terrestrial and airborne communication networks in an open and unified infrastructure.

By utilizing the aforementioned integrated high-speed transmissions with different network topology, the unified airborne networks (called AirNet) are established, and the connection bandwidth of the aircrafts with the ground backbone network can be optimized.

Since many modifications, variations and changes in detail can be made to the described preferred embodiment of the invention, it is intended that all matters in the foregoing description and shown in the accompanying drawings be interpreted as illustrative and not in a limiting sense. Thus, the scope of the invention should be determined by the appended claims and their legal equivalents.

Furthermore, many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific examples of the embodiments disclosed and that modifications and other embodiments are intended to be included within the scope of the appended claims. Although specific terms are employed herein, they are used in a generic and descriptive sense only and not for purposes of limitation.

What is claimed is:

1. An Open Wireless Architecture (OWA) Unified Airborne and Terrestrial Communications system, said system comprising:

a) OWA.Air Transceiver to connect an aircraft with Ground Cells or Ground Airports in both up-link (from Ground to aircraft) and down-link (from aircraft to Ground), or connect one aircraft with another aircraft in an Ad-Hoc or Mesh network Group, b) OWA.Ground Transceiver to connect with said OWA.Air Transceiver in both said up-link and said down-link with Predictable airborne mobile handover protocol, and connect with terrestrial Ground Cell and backbone Ground Network, c) OWA.on Board Wireless Router and Access Point to construct and manage In-Flight wireless mobile network in aircraft cabins, and to connect to said Ground Network through said OWA.Air Transceiver, d) OWA.in Flight Mobile Device or Mobile Notebook to connect to said OWA.on Board Wireless Router and Access Point for In-Flight mode with said In-Flight wireless mobile network in aircraft cabins, and switch to Terrestrial mode with said Ground Network when said aircraft returns to or arrive at said Ground Airports, and e) OWA.VMS (Virtual Mobile Server) to synchronize and manage OWA Mobile Devices or OWA Mobile Notebooks between the Terrestrial mode and the In-Flight mode when mobile users travel across airborne networks and terrestrial networks, and to support many processing tasks and modules moved from said OWA Mobile Devices or OWA Mobile Notebooks to said OWA.VMS to optimize the wireless transmission performance and wireless system performance.

2. A system as recited in claim 1 wherein said OWA.Air Transceiver and said OWA.Ground Transceiver communicate each other by open Radio Transmission Technologies (RTTs) of OWA systems.

3. A system as recited in claim 1 wherein said OWA.Ground Transceiver is an improved terrestrial commercial cellular mobile transceiver system based on OWA technology with antenna beam-forming technology, and space-time antenna array and diversity technology to generate narrow beams to connect said OWA.Air Transceiver for the broadband high-speed connection in said up-link, and provide signal receiving technology from said OWA.Air Transceiver in said down-link.

4. A system as recited in claim 1 wherein said OWA.Ground Transceiver connects said OWA.Air Transceiver through improved terrestrial cellular mobile system with said predictable airborne mobile handover protocol, said handover protocol comprising:

a) said OWA.Air Transceiver loading aircraft navigation routing information and Ground Cells information, b) said OWA.Air Transceiver detecting current and next said Ground Cells for airborne mobility handover control based on detection of received signal strengths from said OWA.Ground Transceivers of said Ground Cells and an updated Ground Cells' sequence by pre-loaded or updated Ground Cells information, c) said OWA.Air Transceiver operating handover among detected Ground Cells through connecting to said OWA.Ground Transceivers by OWA transmission of said improved terrestrial cellular mobile systems when moving aircraft is ready for handover, and d) said OWA.Air Transceiver updating said Ground Cells information for next handover to come after current handover is completed, and repeating the above steps again.

5. A system as recited in claim 1 wherein said OWA.Air Transceiver in one Aircraft connecting with another said OWA.Air Transceiver in another Aircraft with an ad-hoc protocol utilized in said Ad-Hoc or Mesh network Group, said ad-hoc protocol comprising:

a) said OWA.Air Transceiver in one moving aircraft loading said Ad-Hoc or Mesh network Group information and Ground Airports information, b) said OWA.Air Transceiver in said moving aircraft requesting said Group member(s) for Ad-Hoc network connection or mesh network connection based on different airborne networks topology in different regions, c) said OWA.Air Transceiver sending said request until it is accepted by one new Member of said Group, d) said OWA.Air Transceiver in said moving aircraft connecting said new Group Member for Ad-Hoc or Mesh network connection, and e) said moving aircraft, equipped with said OWA.Air Transceiver, further connecting to assigned ground airport by separate OWA aircraft-ground links through said OWA.Air Transceiver to connect said Ad-Hoc or Mesh network with said backbone ground network and dispatch airborne in-flight information and traffic to said ground network and vice versa if said moving aircraft is close to said ground airport, either after take-off, before landing or passing by.

6. A system as recited in claim 5 wherein said Ad-Hoc or Mesh network Group comprises aircrafts with the shortest distance or slowest speed between each other within certain amount of time, and said group is updated frequently at a certain interval.

7. A system as recited in claim 1 wherein said OWA.on Board Wireless Router and Access Point supporting following In-Flight radio transmission technologies (RTTs):

a) standard wireless local area network (WLAN) with reduced and lowest possible transmitting power for airborne in-flight connection, fully monitored and controlled at all times by said OWA.on Board Wireless Router and Access Point to avoid frequency interference with any aviation communication and navigation systems, b) modified wireless local area network for airborne in-flight connection (WLAN.Air) which is completely in compliance with airborne communication regulations and guidelines, c) standard wireless personal access network or personal area network (WPAN) with reduced and lowest possible transmitting power for airborne in-flight connection, fully monitored and controlled at all times by said OWA.on Board Wireless Router and Access Point to avoid frequency interference with any aviation communication and navigation systems, and d) modified wireless personal access network or personal area network for airborne in-flight connection (WPAN.Air) which is completely in compliance with the airborne communication regulations and guidelines.

8. A system as recited in claim 1 wherein said OWA.in Flight Mobile Device or Mobile Notebook connecting to said OWA.on Board Wireless Router and Access Point with an in-flight protocol utilized for In-Flight mode, said in-flight protocol comprising:

a) said OWA.in Flight Mobile Device or Mobile Notebook immediately turning off all of its terrestrial radio transceivers and switching to said In-Flight mode automatically when receiving an In-Flight Pilot Signal of an aircraft through a separate in-flight broadcasting channel in aircraft cabins, b) said OWA.in Flight Mobile Device or Mobile Notebook being connected to said OWA.on Board Wireless Router and Access Point through said In-Flight RTTs, and c) said OWA.in Flight Mobile Device or Mobile Notebook being synchronized to said OWA.VMS on the ground, and being able to push any information to said OWA.VMS or retrieve any information from said OWA.VMS.

9. A system as recited in claim 8 wherein said In-Flight Pilot Signal remains ON and continues broadcasting to all said OWA.in Flight Mobile Devices or Mobile Notebooks in said aircraft cabins to maintain said In-Flight mode as long as said aircraft leaves airport Gate, and said In-Flight Pilot Signal is turned off only after said aircraft returns to and stops completely at airport Gate to enable said OWA.in Flight Mobile Device or Mobile Notebook switch back to said Terrestrial Mode with said ground network.

10. A system as recited in claim 8 wherein said in-flight broadcasting channel utilizes any short-distance wireless broadcasting method to be used in airborne cabins or aircrafts.

11. A system as recited in claim 1 wherein said OWA Mobile Device or said OWA Mobile Notebook automatically becomes said OWA.in Flight Mobile Device or Mobile Notebook in said In-Flight mode, and automatically becomes OWA.Terrestrial Mobile Device or Mobile Notebook in said Terrestrial mode.

12. A system as recited in claim 1 wherein said OWA.VMS is also utilized for mobile user with said OWA Mobile Device or said OWA Mobile Notebook in both said Terrestrial mode and said In-Flight mode, and multiple said OWA Mobile Devices or said OWA Mobile Notebooks can share same said OWA.VMS.

13. A system as recited in claim 1 wherein said OWA.in Flight Mobile Device or Mobile Notebook also supports wireline connection mode by plugging into said OWA.on Board Wireless Router and Access Point through a networking cable or other forms of wiring in the aircraft.

14. A system as recited in claim 1 wherein said OWA.Air Transceiver supports same or different said RTTs (radio transmission technologies) in said up-link and said down-link channels to optimize the airborne transmission performance subject to spectrum efficiency, energy efficiency and transmission efficiency in different commercial environments or regions.

15. A system as recited in claim 1 wherein said OWA.Air Transceiver has an onboard Server caching users' In-Flight broadband information and forwarding said In-Flight broadband information and traffic to ground networks or other aircrafts in said Ad-Hoc or Mesh network Group, and vice versa.

16. A system as recited in claim 1 wherein said airborne mobile handover protocol system to control among multiple said Ground Cells by OWA transmission of improved terrestrial cellular mobile systems is based on preloaded navigation routing information and said Ground Cells information, to enable airborne mobile handover to be predictable and well planned in advance which optimizes airborne connections more effectively and more stably, and further enable airborne mobile handover to be seamless and lossless.

17. An Open Wireless Architecture (OWA) In-Flight Mobile Access Control method, said method comprising:
a) an OWA Mobile Device or Mobile Notebook remaining in Terrestrial mode with Ground cellular networks if said OWA Mobile Device or Mobile Notebook does not receive an In-Flight Pilot Signal in aircraft cabins,
b) said OWA Mobile Device or Mobile Notebook immediately turning off its Terrestrial radio transceivers, switching to In-Flight Mode accordingly after receiving said In-Flight Pilot Signal in aircraft cabins, and said OWA Mobile Device or Mobile Notebook becoming an OWA.in Flight Mobile Device or Mobile Notebook,
c) said OWA.in Flight Mobile Device or Mobile Notebook searching whether a WLAN.Air (wireless local area network for airborne in-flight connection) RTT (radio transmission technology) is available for aircraft in-flight connection, and said OWA.in Flight Mobile Device or Mobile Notebook being connected in said WLAN.Air connection mode if said WLAN.Air RTT is available, otherwise, said OWA.in Flight Mobile Device or Mobile Notebook further searching whether a WPAN.Air (wireless personal access network or personal area network for airborne in-flight connection) RTT (radio transmission technology) is available for aircraft in-flight connection, and said OWA.in Flight Mobile Device or Mobile Notebook being connected in said WPAN.Air connection mode if said WPAN.Air RTT is available,
d) said OWA.in Flight Mobile Device or Mobile Notebook further searching a standard WLAN (wireless local area network) RTT (radio transmission technology) or a standard WPAN (wireless personal access network or personal area network) RTT (radio transmission technology) if both said WLAN.Air RTT and said WPAN.Air RTT are not available for aircraft in-flight connection, and said OWA.in Flight Mobile Device or Mobile Notebook first reducing its radio transmitting power to the minimal level, then connecting to OWA In-Flight Network in said WLAN or said WPAN connection mode if either said WLAN RTT or said WPAN RTT is available, and
e) said OWA.in Flight Mobile Device or Mobile Notebook also supporting wireline connection mode by plugging into OWA.on Board Wireless Router and Access Point through a networking cable or other forms of wiring in aircraft.

18. A method as recited in claim 17 wherein said In-Flight Pilot Signal is broadcasted by any short-distance wireless broadcasting method used in airborne cabins or aircrafts.

19. A method as recited in claim 17 wherein control of said OWA In-Flight Network and all said RTTs for aircraft in-flight connections are fully managed by said OWA.on Board Wireless Router and Access Point in an aircraft to avoid frequency interference with any aviation communication and navigation systems.

20. A method as recited in claim 17 wherein access method of said OWA Mobile Device or OWA Mobile Notebook comprises open radio transmission technologies (RTTs) including terrestrial RTTs and in-flight RTTs based on open wireless architecture (OWA) in both terrestrial mode and in-flight mode.

* * * * *